US012726429B2

(12) United States Patent
Ghosh et al.

(10) Patent No.: US 12,726,429 B2

(45) Date of Patent: Sep. 1, 2026

(54) CONNECTIVITY SERVICE PROVISIONING FOR A SOFTWARE-DEFINED DATA CENTER (SDDC) GROUP

(71) Applicant: VMware LLC, Palo Alto, CA (US)

(72) Inventors: Chandan Ghosh, Bangalore (IN); Gaurav Jindal, Pune (IN); Neeraj Mantri, Pune (IN)

(73) Assignee: VMware LLC, Palo Alto, CA (US)

( * ) Notice: Subject to any disclaimer, the term of this patent is extended or adjusted under 35 U.S.C. 154(b) by 91 days.

(21) Appl. No.: 18/814,255

(22) Filed: Aug. 23, 2024

(65) Prior Publication Data

US 2025/0097138 A1 Mar. 20, 2025

(30) Foreign Application Priority Data

Sep. 14, 2023 (IN) ............................. 202341061926
Sep. 14, 2023 (IN) ............................. 202341061932

(51) Int. Cl.

*H04L 45/24* (2022.01)
*H04L 45/02* (2022.01)
*H04L 45/64* (2022.01)
*H04L 45/76* (2022.01)

(52) U.S. Cl.

CPC .............. *H04L 45/24* (2013.01); *H04L 45/04* (2013.01); *H04L 45/64* (2013.01); *H04L 45/76* (2022.05)

(58) Field of Classification Search

CPC ......... H04L 45/04; H04L 45/24; H04L 45/64; H04L 45/76

See application file for complete search history.

(56) References Cited

U.S. PATENT DOCUMENTS

| | | | | |
|---|---|---|---|---|
| 10,129,096 | B2 * | 11/2018 | Holkkola | H04L 41/40 |
| 10,567,288 | B1 * | 2/2020 | Mutnuru | H04L 67/1019 |
| 10,715,419 | B1 * | 7/2020 | Suryanarayana | H04L 12/4641 |
| 11,553,002 | B2 * | 1/2023 | Rotkop | H04L 63/101 |
| 11,582,083 | B2 | 2/2023 | Shil | |

(Continued)

FOREIGN PATENT DOCUMENTS

WO WO-2017199062 A1 * 11/2017 ......... G06F 9/45558

OTHER PUBLICATIONS

Extended European Search Report mailed Jan. 28, 2025 in European Patent Application No. 24200170.9, 12 pages.

*Primary Examiner* — G. C. Neurauter, Jr.

(74) *Attorney, Agent, or Firm* — Kim & Stewart LLP

(57) ABSTRACT

Example methods and systems for connectivity service provisioning for a software-defined data center (SDDC) group are described. In one example, a computer system may detect an event that affects a first connectivity service connecting multiple members of the SDDC group. The computer system may obtain first routing information that is applicable in a first SDDC; and second routing information that is applicable in a second SDDC. In response to the event, the computer system may generate and send a first instruction towards the first SDDC and a second instruction towards the second SDDC to cause: (a) the first SDDC and second SDDC to establish a second connectivity service; (b) the first SDDC to update the first routing information to associate a first flow with the second connectivity service; and (c) the second SDDC to update the second routing information to associate a second flow with the second connectivity service.

20 Claims, 10 Drawing Sheets

(56) References Cited

U.S. PATENT DOCUMENTS

| | | | | |
|---|---|---|---|---|
| 11,646,941 | B2 * | 5/2023 | Christober | H04L 41/0816 709/223 |
| 12,074,765 | B2 | 8/2024 | Jindal | |
| 12,368,717 | B1 * | 7/2025 | Cheethirala | H04L 63/104 |
| 2015/0249573 | A1 | 9/2015 | Miller et al. | |
| 2020/0374221 | A1 | 11/2020 | Tandon | |
| 2022/0019482 | A1 | 1/2022 | Jiang et al. | |
| 2024/0406104 | A1 | 12/2024 | Jindal et al. | |

* cited by examiner

CONNECTIVITY SERVICE PROVISIONING FOR A SOFTWARE-DEFINED DATA CENTER (SDDC) GROUP

CROSS REFERENCE TO RELATED APPLICATIONS

The present application claims priority from Indian Patent Application number 202341061926 filed Sep. 14, 2023 and Indian Patent Application number 202341061932 filed Sep. 14, 2023, which are incorporated herein by reference.

BACKGROUND

Virtualization allows the abstraction and pooling of hardware resources to support virtual machines in a Software-Defined Networking (SDN) environment, such as a Software-Defined Data Center (SDDC). For example, through server virtualization, virtualization computing instances such as virtual machines (VMs) running different operating systems may be supported by the same physical machine (e.g., referred to as a "host"). Each VM is generally provisioned with virtual resources to run an operating system and applications. The virtual resources may include central processing unit (CPU) resources, memory resources, storage resources, network resources, etc. In practice, a user (e.g., organization) may run VMs using on-premises data center infrastructure that is under the user's private ownership and control. Additionally, the user may run VMs within an SDDC deployed on the cloud using infrastructure under the ownership and control of a public cloud provider. It is desirable to improve the performance of traffic forwarding among VMs deployed in different SDDCs.

DETAILED DESCRIPTION

Figure 1:
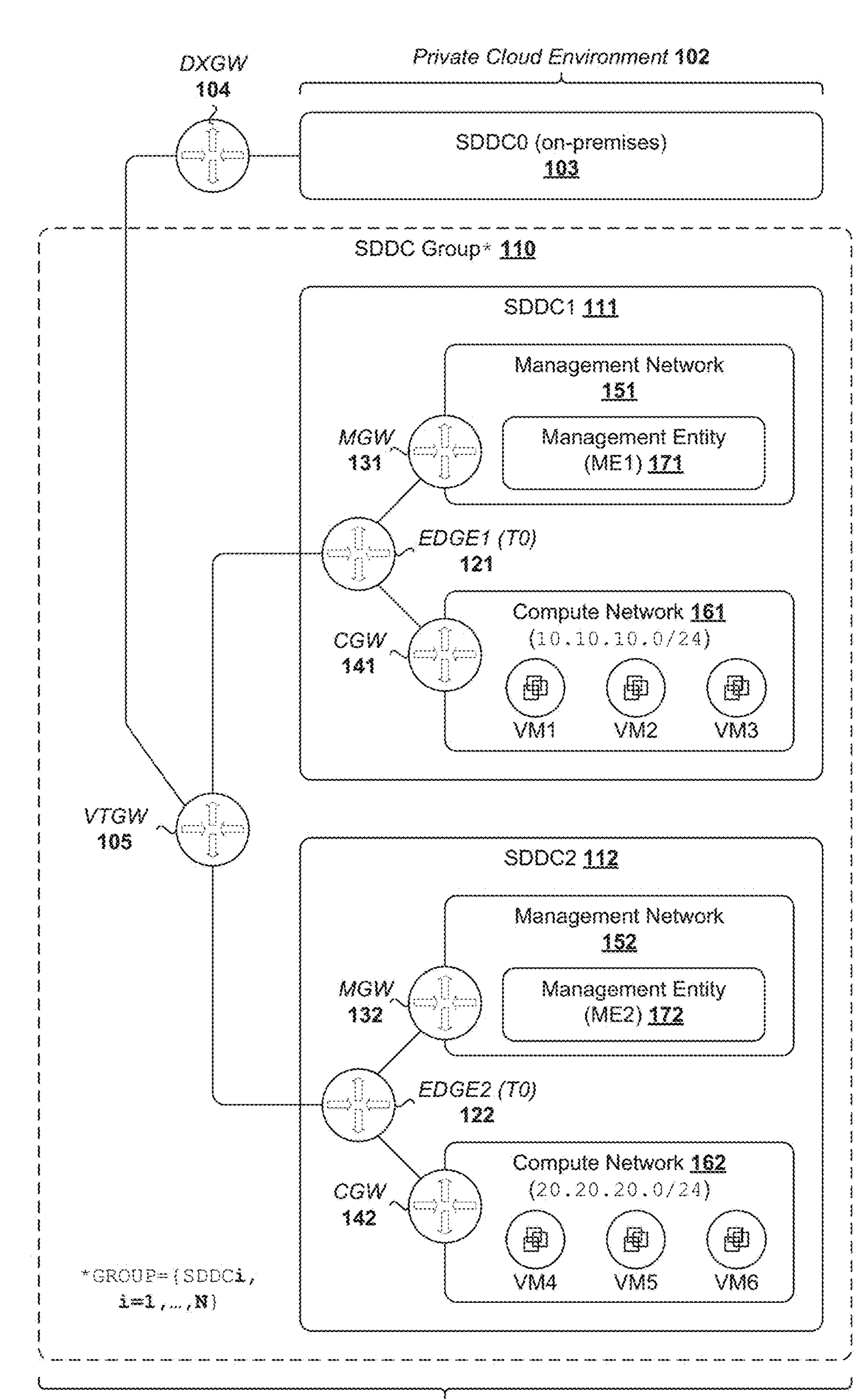
FIG. 1 is a schematic diagram illustrating an example software-defined networking (SDN) environment in which a Software-Defined Data Center (SDDC) group is deployed.

According to a first aspect, examples of present disclosure may provide method(s) and system(s) for on-demand connectivity service provisioning for a software-defined data center (SDDC) group. Various examples of the first aspect will be described using FIGS. 1-5. In one example, a computer system (e.g., cloud orchestrator 301 in FIG. 3) may detect an event that affects a first connectivity service connecting multiple members of the SDDC group, including a first SDDC and a second SDDC (e.g., SDDC1 111 and SDDC2 112 in FIG. 3). The computer system may obtain first routing information (e.g., see 320 in FIG. 3) that is applicable in the first SDDC and associates a first flow with the first connectivity service; and second routing information (e.g., see 330 in FIG. 3) that is applicable in the second SDDC and associates a second flow with the first connectivity service.

In response to the event, the computer system may generate and send a first instruction (e.g., see 340 in FIG. 3) towards the first SDDC and a second instruction (e.g., see 350 in FIG. 3) towards the second SDDC to cause: (a) the first SDDC and/or the second SDDC to establish a second connectivity service between the first SDDC and the second SDDC; (b) the first SDDC to update the first routing information to associate the first flow with the second connectivity service; and (c) the second SDDC to update the second routing information to associate the second flow with the second connectivity service (e.g., see 360-380 in FIG. 3).

According to a second aspect, examples of present disclosure may provide method(s) and system(s) for a computer system to perform dynamic connectivity service configuration for an SDDC group. Various examples of the second aspect will be discussed below using FIGS. 6-9. In one example, the computer system (e.g., cloud orchestrator 301 in FIG. 3) may detect an event associated with an SDDC group that includes at least a first SDDC and a second SDDC (e.g., SDDC1 111 and SDDC2 112 in FIG. 3) that are capable of communicating using a first connectivity service and a second connectivity service.

In response to determination to enable the first connectivity service based on the event, the computer system may perform a first configuration to instruct: (a) the first SDDC to update first routing information and forward a first flow towards the second SDDC using the first connectivity service; and (b) the second SDDC to update second routing information and forward a second flow towards the first SDDC using the first connectivity service. See 710, 720-725, 730-735 and 740-745 in FIG. 7.

Otherwise, in response to determination to enable the second connectivity service based on the event, the computer system may perform a second configuration to instruct: (a) the first SDDC to update the first routing information and forward the first flow towards the second SDDC using the second connectivity service; and (b) the second SDDC to update the second routing information and forward the second flow towards the first SDDC using the second connectivity service. See 750, 760-765, 770-775 and 780-785 in FIG. 7.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

FIG. 1 is a schematic diagram illustrating example software-defined networking (SDN) environment 100 in which an SDDC group may be deployed. It should be understood that, depending on the desired implementation, SDN environment 100 may include additional and/or alternative components than that shown in FIG. 1. Although the terms "first" and "second" are used to describe various elements throughout the present disclosure, these elements should not be limited by these terms. These terms are used to distinguish one element from another. A first element may be referred to as a second element, and vice versa.

In the example in FIG. 1, SDN environment 100 spans across multiple cloud environments that are located at different geographical sites, such as first cloud environment 101 (e.g., public cloud), second cloud environment 102 (e.g., private cloud), etc. First cloud environment 101 may be a private cloud environment that includes an on-premises data center 103 (denoted as SDDC0). In general, the term "private cloud environment" may refer to an on-premises data center or cloud platform supported by infrastructure that is under an organization's private ownership and control. In contrast, the term "public cloud environment" may refer generally a cloud platform supported by infrastructure that is under the ownership and control of a public cloud provider.

A public cloud provider is generally an entity that offers a cloud-based platform to multiple users or tenants. This way, a user may take advantage of the scalability and flexibility provided by public cloud environment 101 for data center capacity extension, disaster recovery, etc. Throughout the present disclosure, public cloud environment 101 will be exemplified using VMware Cloud™ (VMC) on Amazon Web Services® (AWS) and Amazon Virtual Private Clouds (VPCs). Amazon VPC and Amazon AWS are registered trademarks of Amazon Technologies, Inc. It should be understood that any additional and/or additional cloud technology may be implemented, such as Microsoft Azure®, Google Cloud Platform™, IBM Cloud™, etc. Depending on the desired implementation, both cloud environments 101-102 may be private (i.e., on-premises data centers) or public.

In the example in FIG. 1, an SDDC group (see 110) may be deployed in public cloud environment 101 using infrastructure provided by a cloud provider. SDDC group 110 (also known as SDDC deployment group) that includes multiple (N) members may be denoted as GROUP={SDDC-i, i=1, . . . , N}, where SDDC-i=i$^{th}$ member in the group. Using N=2 as an example, SDDC group 110 may include SDDC1 111 ("first SDDC") and SDDC2 112 ("second SDDC"). As used herein, the term "SDDC group" may refer generally to a logical grouping of multiple SDDCs (i.e., members). The term "SDDC" may refer generally to a data center that includes software-implemented resources through one or more virtualization technologies, such as compute virtualization, storage virtualization, network virtualization, etc.

Members of SDDC group 110 may be interconnected via virtual transit gateway (VTGW) 105 implemented using any suitable technology, such as VMware Transit Connect (available from VMware, Inc.). In public cloud environment 101, the term "virtual transit gateway" may refer generally to a logical gateway that is deployed to connect various networks. For example, VTGW 105 may act as a central router for traffic originating from, or destined for, SDDC group 110. Using a hub and spoke model, VTGW 105 may be used to forward SDDC group traffic (a) among members of SDDC group 110, (b) between one SDDC 111/112 and on-premises data center 103 via direct connect gateway (DXGW) 104 and (c) between one SDDC 111/112 and a virtual network (e.g., attached VPC).

In practice, grouping multiple SDDCs into an SDDC group may provide a number of benefits to an organization that requires a high-bandwidth, low latency connectivity among its SDDCs. SDDC group 110 may be configured to facilitate centralized management of the organization's multiple SDDCs and how they connect with each other and other network(s). This way, multiple SDDCs may be managed as a single unit, which can simplify management and operations. SDDC group 110 may be scaled to support a large number of SDDCs and VPCs. In general, VPCs may represent virtual networks or logically isolated sections of a public cloud environment. Example traffic forwarding between an on-premises data center and an SDDC deployed on a public cloud environment are described in a related U.S. patent application Ser. No. 18/277,334, which is incorporated herein by reference.

Each SDDC 111/112 may include EDGE 121/122 ("network element") to facilitate traffic forwarding to/from VTGW 105. In practice, EDGE 121/122 may implement a logical service router (SR) to provide networking services, such as gateway service, domain name system (DNS) forwarding, IP address assignment using dynamic host configuration protocol (DHCP), source network address translation (SNAT), destination NAT (DNAT), deep packet inspection, etc. When acting as a gateway, an EDGE 121/122 may be considered to be an exit point to an external network. EDGE 121/122 may be implemented using one or more virtual machines (VMs) and/or physical machines (also known as "bare metal machines").

EDGE 121/122 may represent a tier-0 edge gateway that is connected with tier-1 management gateway 131/132 (see "MGW") and tier-1 compute gateway 141/142 (see "CGW"). MGW 131/132 may be deployed to handle management-related traffic to and/or from management entities residing on management network 151/152. CGW 141/142 may be deployed to handle workload-related traffic to and/or from virtual machines (VMs) residing on compute network 161/162. For example, SDDC1 111 may include various VMs (e.g., VM1, VM2 and VM3) on first network=10.10.10.0/24. SDDC2 112 may include various VMs (e.g., VM4, VM5 and VM6) on second network=20.20.20.0/24. Any group traffic between SDDC1 111 (e.g., first network) and SDDC2 112 (e.g., second network) may be forwarded via VTGW 105.

In practice, connectivity among members of SDDC group 110 via VTGW 105 may be affected in various situations. For example, configuration or reconfiguration of SDDC group 110 and VTGW 105 may take several minutes (e.g., more than five minutes) and result in no connectivity among members 111-112. During this time, users may experience performance degradation or system downtime, which is undesirable because operations of various applications and VMs in SDDC 111/112 will be affected.

First Aspect: On-Demand Connectivity Service Provisioning

Figure 2:
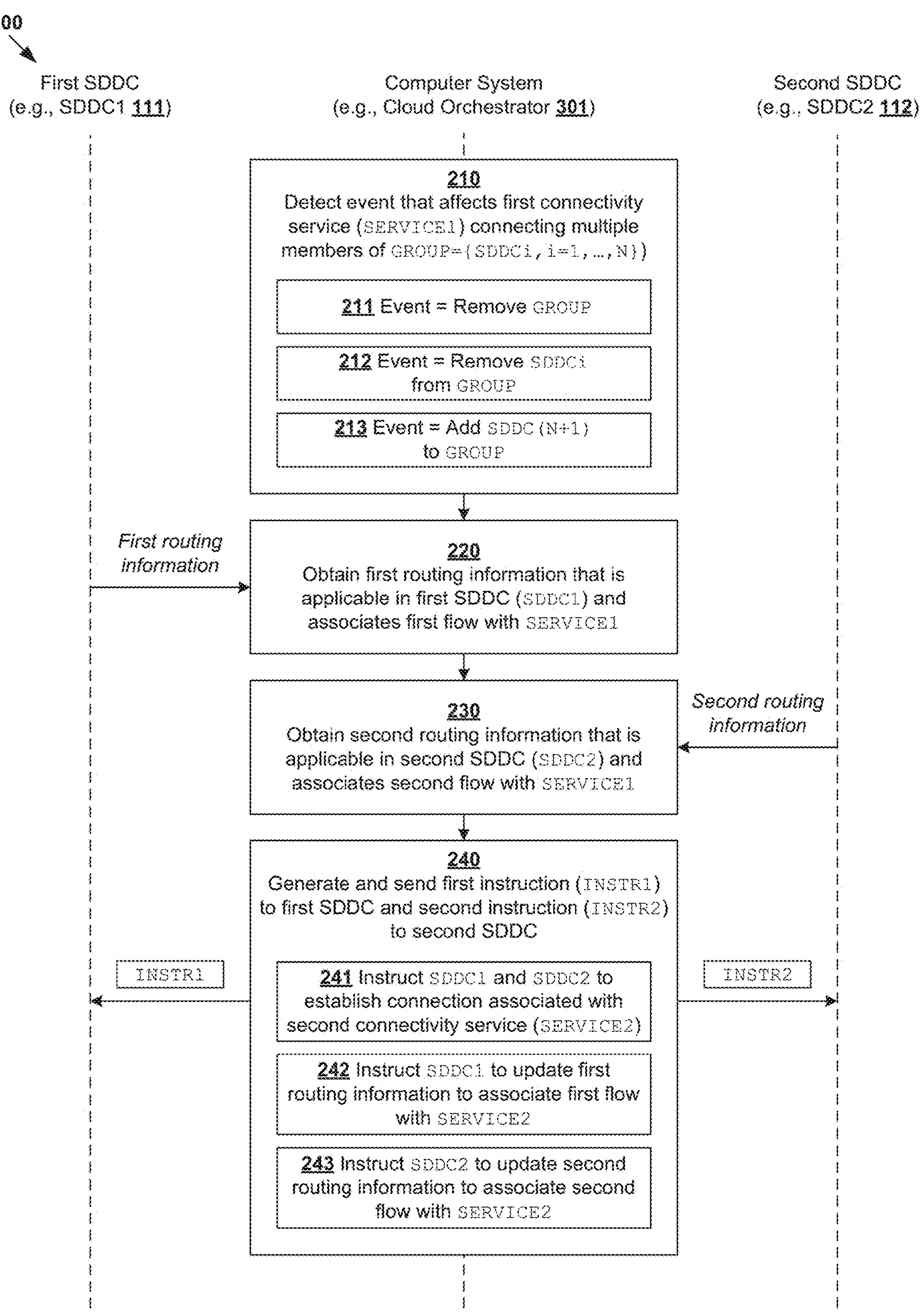
FIG. 2 is a schematic diagram illustrating an example on-demand connectivity service provisioning for an SDDC group.

According to a first aspect of the present disclosure, on-demand connectivity service provisioning may be implemented to improve the performance of SDDC group 110, especially when connectivity via VTGW 105 is affected. Throughout the present disclosure, the term "on-demand" in relation to "on-demand connectivity service provisioning" may refer generally to the provisioning of a second connectivity service in response to detecting an event that affects a first connectivity service connecting members of SDDC group 110. In more detail, FIG. 2 is a flowchart of example process 200 for computer system 301 to perform on-demand connectivity service provisioning for SDDC group 110. Example process 200 may include one or more operations, functions, or actions illustrated by one or more blocks, such as 210 to 243. Depending on the desired implementation, various blocks may be combined into fewer blocks, divided into additional blocks, and/or eliminated.

The example in FIG. 2 will be described using FIG. 3, which is a schematic diagram illustrating example on-demand connectivity service provisioning for SDDC group 110. In the following, various examples will be explained using "computer system" capable of acting as a management entity to manage and configure SDDC group 110 and its members, such as cloud orchestrator 301 in FIG. 3. SDDCs 111-112 will be used as example "first SDDC" and "second SDDC." Note that any SDDC (i.e., SDDCi, where $i \in 1, \ldots, N$) within SDDC group 110 may be referred to as "first" or "second" SDDC.

Figure 3:
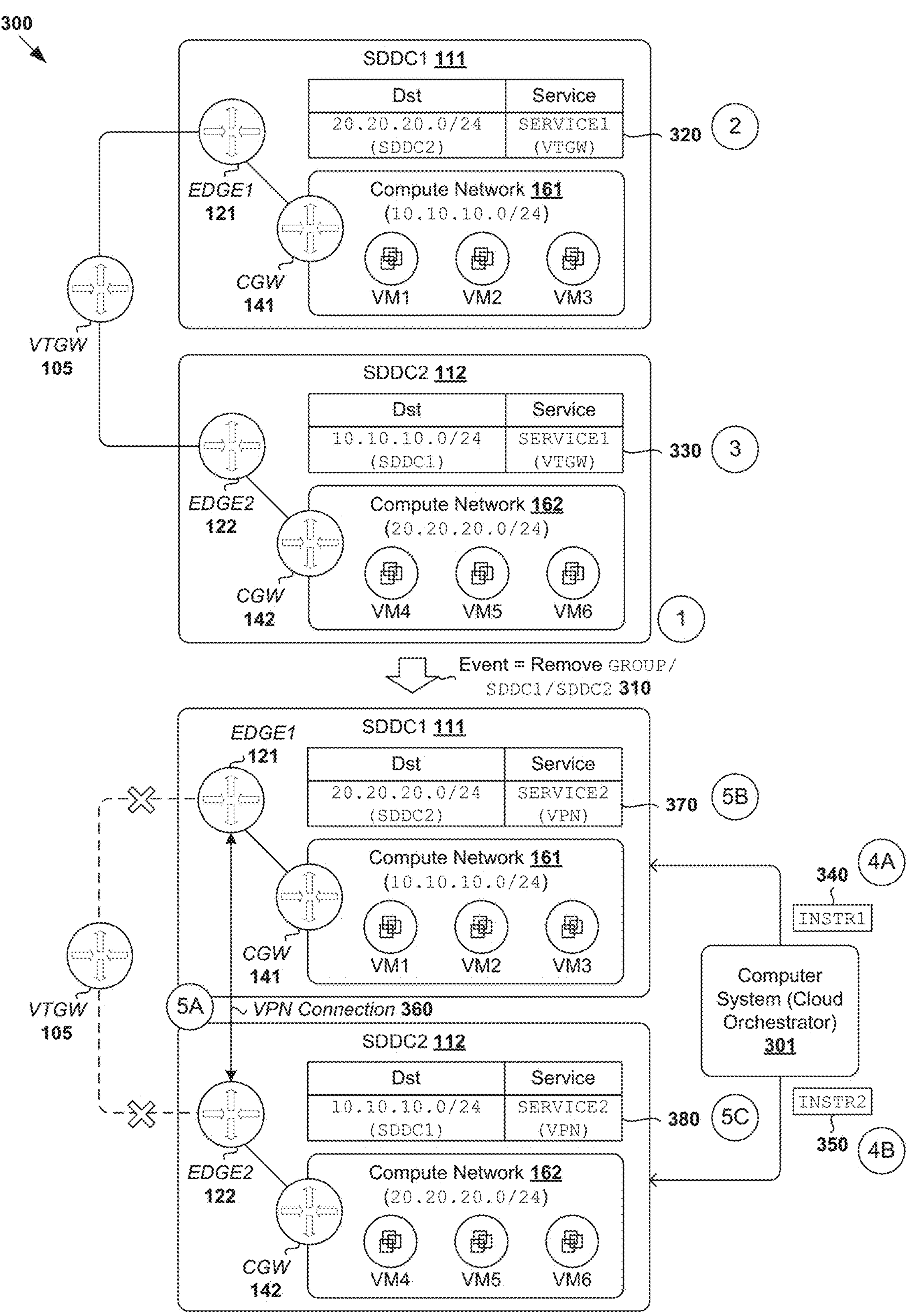
FIG. 3 is a flowchart of an example process for a computer system to perform on-demand connectivity service provisioning for an SDDC group.

At 210 in FIGS. 2 and 310 in FIG. 3, computer system=cloud orchestrator 301 may detect an event that affects a first connectivity service (denoted as SERVICE1) provided by VTGW 105 connecting multiple members of SDDC group 110. For example, multiple members of SDDC group 110 may include first SDDC=SDDC1 111 and second SDDC=SDDC2 112. Depending on the desired implementation, the event may be associated with SDDC group 110 to (a) remove the SDDC group from SDN environment 100, (b) remove the first/second SDDC 111/112 from the SDDC group, or (c) add a third SDDC, being a new member, to the SDDC group. See also 211-213 in FIGS. 2 and 310 in FIG. 3.

At 220 in FIGS. 2 and 320 in FIG. 3, cloud orchestrator 301 may obtain first routing information that is applicable in first SDDC=SDDC1 111 and associates a first flow with SERVICE1 provided by VTGW 105. For example in FIG. 3, first routing information 320 that is applicable by EDGE1 121 in SDDC1 111 may associate a first flow towards destination network=20.20.20.0/24 in SDDC2 112 with SERVICE1 (VTGW 105). Here, the term "obtaining" may refer generally to one entity retrieving or receiving the relevant information from another entity or data store.

At 230 in FIGS. 2 and 330 in FIG. 3, cloud orchestrator 301 may obtain second routing information that is applicable in second SDDC=SDDC2 112 and associates a second flow with SERVICE1 provided by VTGW 105. For example in FIG. 3, second routing information 330 that is applicable by EDGE2 122 in SDDC2 112 may associate a second flow towards destination network=10.10.10.0/24 in SDDC1 111 with SERVICE1 (VTGW 105). The term "applicable by" in blocks 220-230 may refer generally to the routing information being accessible and usable by an entity (e.g., EDGE 121/122) to perform packet forwarding.

At 240 in FIGS. 2 and 340-350 in FIG. 3, cloud orchestrator 301 may instruct first SDDC=SDDC1 111 and second SDDC=SDDC2 112 to transition from SERVICE1 to a second connectivity service (denoted as SERVICE2). Here, the term "instructing a particular SDDC" may refer generally to generating and sending instruction(s) to an entity (e.g., management entity, EDGE, etc.) associated with the particular SDDC. For example in FIG. 3, cloud orchestrator 301 may generate and send first instruction(s) 340 towards SDDC1 111 and second instruction(s) 350 towards SDDC2 112 to cause SDDC1 111 and/or SDDC2 112 to provision or establish SERVICE2 (see 360). Further, at 370-380, the instructions may cause (a) SDDC1 111 to update the first routing information to associate the first flow with SERVICE2 and (b) SDDC2 112 to update the second routing information to associate the second flow with SERVICE2. See also 241-243 in FIG. 2.

As used herein, the term "connectivity service" may refer generally to an approach or technology for connecting at least two members of an SDDC group. Any suitable "second connectivity service" capable of providing connectivity between a pair of SDDCs may be provisioned, such as virtual private network (VPN), route-based VPN (RBVPN), policy-based VPN, etc. In practice, VPN provisioning may involve establishing an Internet Protocol Security (IPSec) tunnel using Internet Key Exchange version 2 (IKEv2) for forwarding traffic between a pair of SDDCs. In the example in FIG. 3, VPN connection 360 may be established between (a) first network element=EDGE1 121 at SDDC1 111 and (b) second network element=EDGE2 122 at SDDC2 112. At SDDC1 111, updated first routing information 370 may associate the first flow towards destination network=20.20.20.0/24 with SERVICE2 (VPN). At SDDC2 112, updated second routing information 380 may associate the second flow towards destination network=10.10.10.0/24 with SERVICE2 (VPN).

Using examples of the present disclosure, SERVICE2 may be provisioned in an on-demand, intelligent manner in response to event(s) that may affect connectivity via SERVICE1. Once SERVICE2 is provisioned, SDDC group traffic may be forwarded using SERVICE2 instead of SERVICE1 to reduce the likelihood or duration of system downtime, thereby improving the overall performance of SDDCs 111-112 and supported applications. SERVICE1=VTGW 105 may be deployed using a hub and spoke model to provide substantially high-bandwidth, low-latency connectivity (a) among multiple SDDCs within SDDC group 110, (b) between at least one member of SDDC group 110 and on-premises data center 103 and (c) between at least one member of SDDC group 110 and virtual network(s) outside of SDDC group 110, such as attached VPC(s). In general, SERVICE1 is designed to provide better scalability as the number of SDDCs and attached VPNs increases.

Detailed Examples of On-Demand VPN Provisioning

The example in FIGS. 1-3 will be explained further using FIG. 4, which is a flowchart of example detailed process 400 for computer system 301 to perform on-demand connectivity service provisioning for SDDC group 110. Example process 400 may include one or more operations, functions, or actions illustrated by one or more blocks, such as 410 to 493. Depending on the desired implementation, various blocks may be combined into fewer blocks, divided into additional blocks, and/or eliminated. Using examples of the present disclosure, SERVICE2=VPN connection 360 may be exposed as a backup option and provisioned on demand when connectivity using SERVICE1=VTGW 105 is affected.

(a) Event Detection

Figure 4:
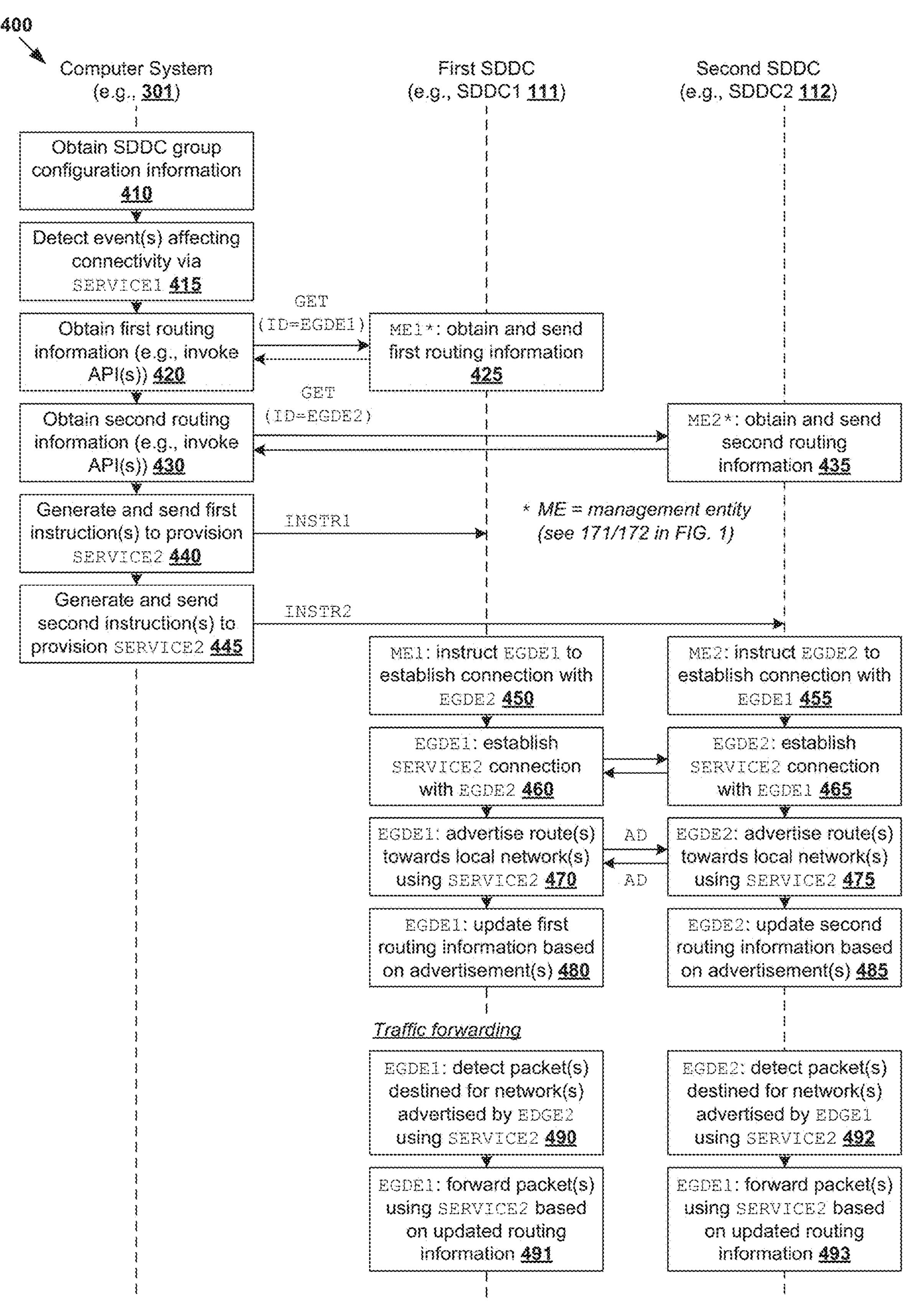
FIG. 4 is a flowchart of an example detailed process for a computer system to perform on-demand connectivity service provisioning for an SDDC group.

At 410 in FIG. 4, cloud orchestrator 301 may obtain configuration information associated with SDDC group 110, such as by invoking application programming interface(s)

(API(s)) supported by a cloud provider (e.g., AWS). The configuration information may be obtained when SDDC group 110 is recreated and include a list of members of SDDC group 110. At 415 in FIG. 4, based on the SDDC group configuration information, cloud orchestrator 301 may detect one of the following events that may affect connectivity via VTGW 105 (i.e., SERVICE1): (a) removal of SDDC group 110, (b) removal of SDDC(s) from SDDC group 110 and (c) addition of SDDC to SDDC group 110.

(b) Route Collection

At 420-425 and 430-435 in FIG. 4, cloud orchestrator 301 may perform route collection to obtain first routing information 320 that is applicable in SDDC1 111 and second routing information 330 that is applicable in SDDC2 112. Routing information 320/330 (e.g., tier-0 route tables) may be obtained by invoking API(s) supported by management entity 171/172 (see FIG. 1) in SDDC 111/112. For example, management entity 171/172 may be an SDN manager (e.g., NSX Manager available from VMware, Inc.) that includes a policy service component.

For example, routing information 320/330 may be obtained (e.g., retrieved or received) using a GET operation using parameters such as EDGE identifier (ID), etc. For example, a first GET operation specifying ID="EDGE1" associated with EDGE1 121 may be invoked to obtain first routing information 320 from first management entity 171. A second GET operation specifying ID="EDGE2" associated with EDGE2 122 may be invoked to obtain second routing information 330 from second management entity 172. Other parameter(s) may specify a list of fields to be included in the query result, how routing entries are sorted in the query result, etc. In practice, routing information 320/330 may specify a next hop associated with SERVICE1=VTGW 105.

Depending on the desired implementation, route collection may further involve cloud orchestrator 301 obtaining routing information (e.g., saving routes) advertised over VTGW 105 connectivity uplink by invoking API(s), such as to initiate a GET operation (e.g., GET/transit-gateway-route-tables/, /transit-gateway-routes/ or /transit-gateway-routes/<id>) identifying a unique ID associated with VTGW 105. The query result may include routing information (i.e., transit gateway routes) applicable by VTGW 105 to facilitate SDDC group traffic forwarding (a) among multiple SDDCs, (b) between SDDC(s) and on-premises data center 103 and (c) between SDDC(s) and attached VPC(s).

(c) VPN Provisioning

At 440-445 in FIG. 4, cloud orchestrator 301 may initiate on-demand VPN provisioning by generating and sending first instruction(s) 340 towards first management entity 171 and second instruction(s) 350 towards second management entity 172. The instruction(s) may be sent using any suitable approach, such as by invoking API(s) supported by management entity 171/172.

At 450 in FIG. 4, in response to receiving first instruction(s) 340, first management entity 171 may instruct EDGE1 121 to establish VPN connection/tunnel 360 with EDGE2 122 and to perform route advertisement using SERVICE2. Similarly, at 455, in response to receiving second instruction(s) 350, second management entity 172 may instruct EDGE2 122 to establish VPN connection 360 with EDGE1 121 and to perform route advertisement using SERVICE2.

At 460-465 in FIG. 4, EDGE1 121 and EDGE2 122 may establish VPN connection 360, such as using Internet Key Exchange (IKE) or any other protocol. In general, IPSec supports automated generation and negotiation of keys and security associations (SAs) using the IKE protocol. IKE negotiation includes two phases. Phase one involves EDGE1 121 and EDGE2 122 exchanging proposals for how to authenticate and secure VPN connection 360. Once phase one is successful, phase two involves EDGE1 121 and EDGE2 122 negotiating security associations (SAs) to secure packets that are forwarded via VPN connection 360.

(d) Route Advertisement

At 470 in FIG. 4, EDGE1 121 may generate and send first route advertisement(s) specifying local network=10.10.10.0/24 towards EDGE2 122 using SERVICE2=VPN connection 360. This is to advertise to SDDC2 112 that the local network segment is reachable using SERVICE2. At 485, in response to detecting first route advertisement(s) over VPN connection 360, EDGE2 122 may update its routing information to associate (a) destination network=10.10.10.0/24 located in SDDC1 111 with (b) a next hop=RBVPN virtual tunnel interface (VTI) associated with SERVICE2 at SDDC2 112. This way, at 492-493, EDGE2 122 may forward any subsequent packet(s) destined for 10.10.10.0/24 using SERVICE2 based on the updated routing information.

At 475 in FIG. 4, EDGE2 122 may generate and send second route advertisement(s) specifying local network=20.20.20.0/24 towards EDGE1 121 using SERVICE2=VPN connection 360. This is to advertise to SDDC1 111 that the local network segment is reachable using SERVICE2. At 480, in response to detecting second route advertisement(s) over VPN connection 360, EDGE1 121 may update its routing information to associate (a) destination network=20.20.20.0/24 located in SDDC2 112 with (b) a next hop=RBVPN VTI associated with SERVICE2 at SDDC1 111. This way, at 490-491, EDGE1 121 may forward any subsequent packet(s) belonging to a first flow destined for 20.20.20.0/24 using SERVICE2 based on the updated routing information.

Any suitable protocol may be used to propagate/advertise routes, such as border gateway protocol (BGP), etc. Traffic drop minimization may be achieved when BGP advertisement is performed at substantially the same time by EDGE1 121 and EDGE2 122 based on instructions 340-350 from cloud orchestrator 301. BGP advertisement is not performed until the VPN service is up. Depending on the desired implementation, the routes collected at blocks 420-425 may be advertised at blocks 455, 465 to provide the same connectivity experience as it as before switching from VTGW 105 to VPN connection 360. The routes between SDDC1 111 and SDDC2 112 may also include tier-1 routes, user-created prefix lists, etc. Segments connected to CGW 141/142 may also be propagated to tier-0 EDGE 121/122.

At 490-491 in FIG. 4, in response to detecting packet(s) destined for 20.20.20.0/24, EDGE1 121 may apply updated routing information 370 specifying (20.20.20.0/24, SERVICE2) to forward the packet(s) towards EDGE2 122 via VPN connection 260. Similarly, at 492-493, in response to detecting packet(s) destined for 10.10.10.0/24, EDGE2 122 may apply updated routing information 380 specifying (10.10.10.0/24, SERVICE2) to forward the packet(s) towards EDGE1 121 via VPN connection 260. See 370, 380 in FIG. 8.

(e) Example Events

Figure 5:
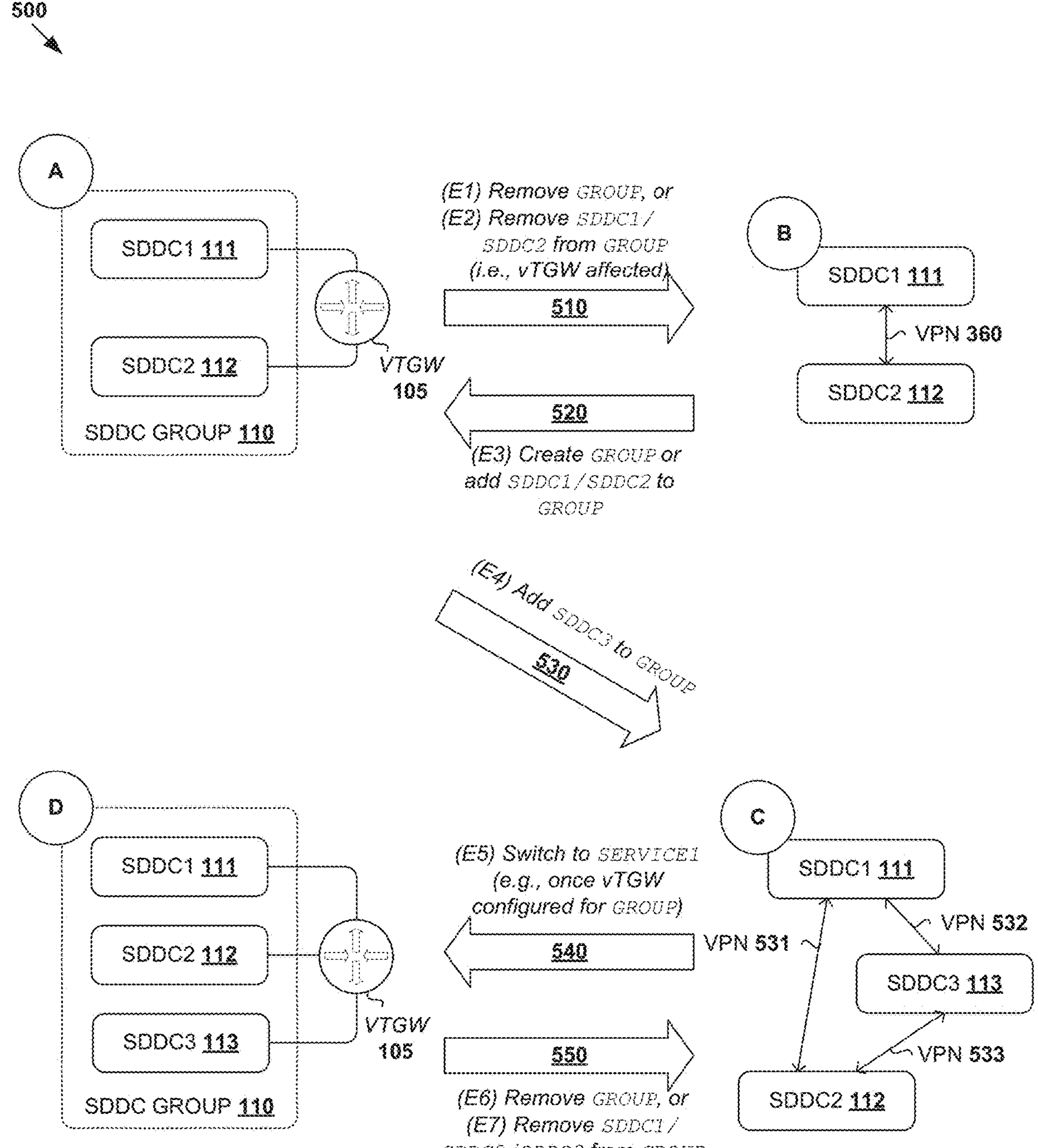
FIG. 5 is a schematic diagram illustrating example events for on-demand connectivity service provisioning for an SDDC group.

FIG. 5 is a schematic diagram illustrating example events 500 for on-demand connectivity service provisioning for SDDC group 110. In this example, four connectivity service configurations (labelled "A" to "D") are shown. Various implementation details described above with reference to the transition from configuration "A" to "C" are also applicable to other transitions. These details are not repeated below for brevity.

At 510 in FIG. 5, cloud orchestrator 301 may detect a first event (E1) to remove SDDC group 110 (i.e., delete SDDC group configuration) or a second event (E2) to remove SDDC1 111 and/or SDDC2 112 from SDDC group 110. In response, cloud orchestrator 301 may initiate on-demand VPN provisioning to instruct SDDC1 111 and SDDC2 112 to establish VPN connection 360 and to update their routing information accordingly. This causes a transition from configuration "A" that relies on VTGW 105 to configuration "B" that relies on VPN connection 360.

At 520 in FIG. 5, cloud orchestrator 301 may detect a third event (E3) to configure SDDC group 110 to include SDDCs 111-112, such as by adding SDDC1 111 and SDDC2 112 back to SDDC group 110. Once SDDC group configuration is completed and VTGW 105 is up and running, cloud orchestrator 301 may instruct SDDCs 111-112 to transition from configuration "B" to configuration "A." As used herein, the term "up and running" may refer generally to a connectivity service being operational to provide connectivity among members of SDDC group 110. Cloud orchestrator 301 may instruct SDDC 111/112 via management entity 171/172 to disable or remove VPN connection 360 and BGP configuration information. Cloud orchestrator 301 may further instruct (a) SDDC1 111 to re-associate the first flow with the first connectivity service and (b) SDDC2 112 to re-associate the second flow with the first connectivity service. Deleted routing entries may be persisted in a database. These steps help to minimize traffic drop during the transition.

At 530 in FIG. 5, cloud orchestrator 301 may detect a fourth event (E4) to add third SDDC=SDDC3 113 (i.e., new member) to SDDC group 110, which may affect the connectivity via VGTW 105 during SDDC group configuration. In response, cloud orchestrator 301 may initiate on-demand VPN provisioning to instruct SDDC1 111, SDDC2 112 and SDDC3 113 to establish VPN connections (see 531-533) and to update their routing information to cause traffic routing via the VPN connections instead of VTGW 105. This causes a transition from configuration "A" that relies on VTGW 105 to configuration "C" that relies on VPN connections 531-533.

At 540 in FIG. 5, cloud orchestrator 301 may detect a fifth event (E5) indicating the completion of SDDC group configuration and restoration of connectivity via VTGW 105. In response, cloud orchestrator 301 may instruct all members (i.e., SDDC1 111, SDDC2 112 and SDDC3 113) to transition from configuration "C" that relies on VPN connections 531-533 to configuration "D" that relies on VTGW 105. This may involve instructing SDDCs 111-113 to delete VPN connections 531-533, BGP configuration information and associated routing entries. This is to ensure that subsequent SDDC group traffic is routed via VTGW 105. Subsequent route advertisements may be performed via VTGW 105.

At 550 in FIG. 5, cloud orchestrator 301 may detect a sixth event (E6) to remove SDDC group 110 (now with three members 111-113) or a seventh event (E7) to remove SDDC 111/112/113 from SDDC group 110. In response, cloud orchestrator 301 may initiate on-demand VPN provisioning to instruct SDDCs 111-113 to establish VPN connections 531-533 and to update their routing information such that traffic is routed via VPN connections 531-533. This causes a transition from configuration "D" to configuration "C." In practice, the number of VPN connections provisioned for SDDC group 110 may depend on the number of members in that SDDC group 110. Each VPN connection may be one to one, or one to many.

Second Aspect: Dynamic Connectivity Service Configuration

According to a second aspect of the present disclosure, dynamic connectivity service configuration may be performed for SDDC group 110 to facilitate switching among multiple (M) connectivity services, such as dynamic toggling between a first connectivity service and a second connectivity service in the case of M=2. In this case, multiple connectivity services may be pre-provisioned according to the examples in FIGS. 6-9 instead of an on-demand basis. Examples of the present disclosure may be implemented to reduce the likelihood of system downtime, as well as to provide SDDC owners with more flexibility in relation to connectivity service configuration. It should be understood that more than two (i.e., M>2) connectivity services may be provisioned.

Figure 6:
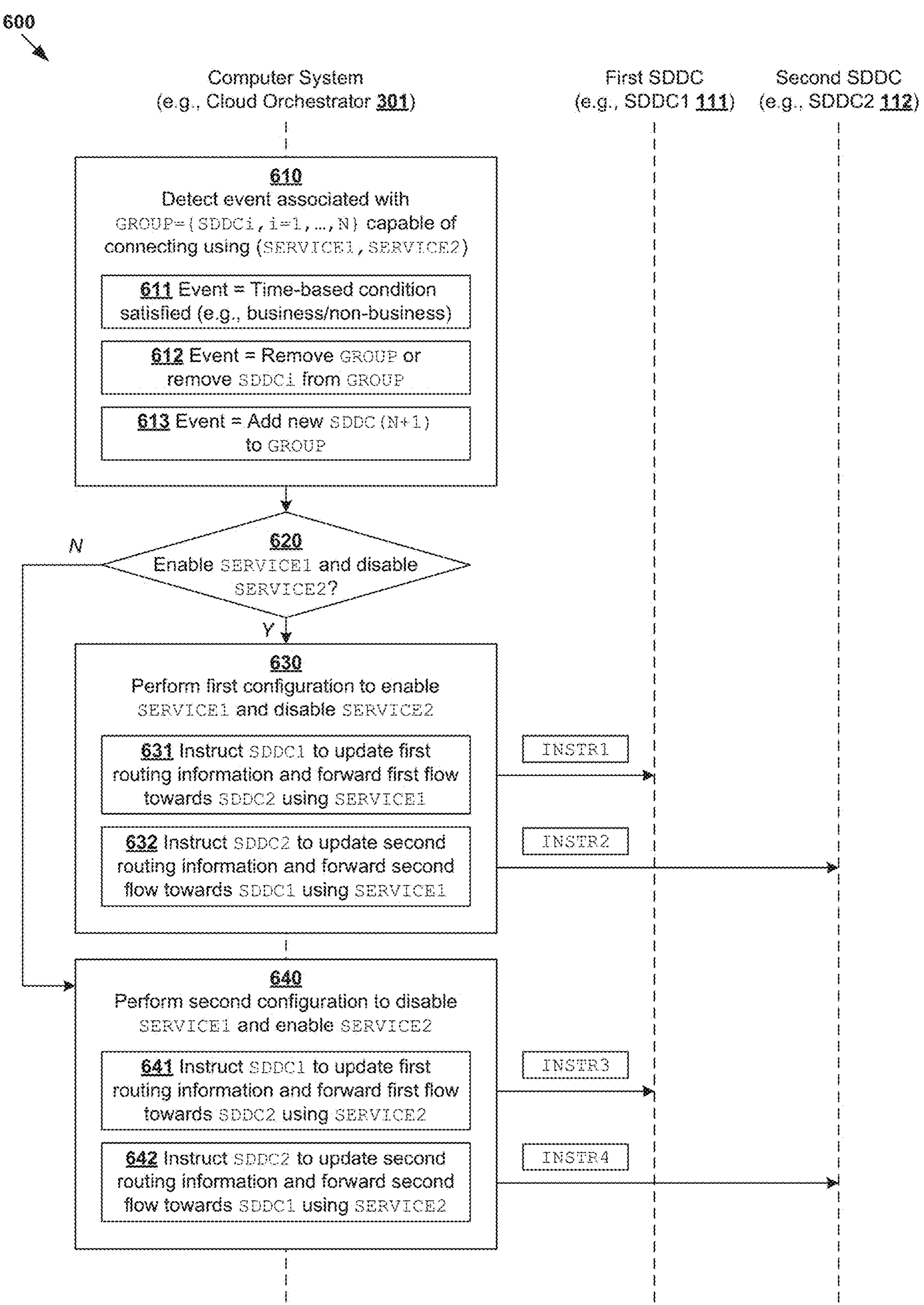
FIG. 6 is a flowchart of an example process for a computer system to perform dynamic connectivity service configuration for an SDDC group.

FIG. 6 is a flowchart of example process 600 for computer system 301 to perform dynamic connectivity service configuration for SDDC group 110. Example process 600 may include one or more operations, functions, or actions illustrated by one or more blocks, such as 610 to 642. Depending on the desired implementation, various blocks may be combined into fewer blocks, divided into additional blocks, and/or eliminated. The example in FIG. 6 will be explained using FIG. 7, which is a schematic diagram illustrating example dynamic connectivity service configuration 700 for SDDC group 110.

Figure 7:
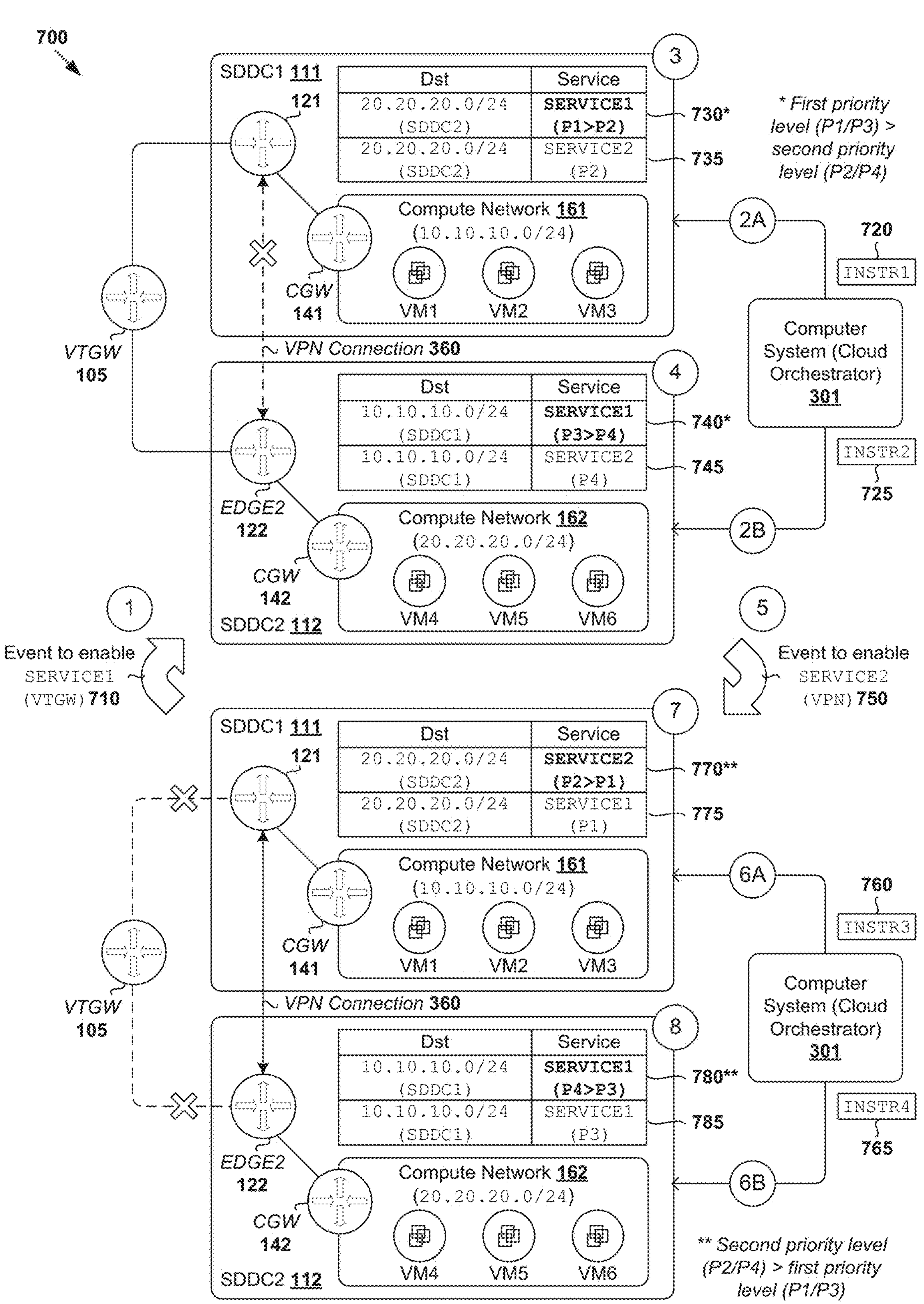
FIG. 7 is a schematic diagram illustrating an example dynamic connectivity service configuration for an SDDC group.

In the example in FIG. 7, VTGW 105 and VPN connection 360 introduced in FIG. 3 may be used as example "first connectivity service" (SERVICE1) and "second connectivity service" (SERVICE1). In the following, various examples will be explained using "computer system" capable of acting as a management entity to manage and configure SDDC group 110 and its members, such as cloud orchestrator 301 in FIG. 3. SDDCs 111-112 will be used as example "first SDDC" and "second SDDC."

At 610 in FIG. 6, cloud orchestrator 301 may detect an event associated with SDDC group 110 that includes at least first SDDC=SDDC1 111 and second SDDC=SDDC2 112. For example in FIG. 7, SDDC1 111 and SDDC2 112 may be capable of communicating or connecting using a first connectivity service (SERVICE1) provided by VTGW 105 and a second connectivity service (SERVICE2) provided by VPN connection 360. Any additional and/or alternative connectivity services may be implemented.

Depending on the desired implementation, block 610 may involve detecting the event based on determination whether a time-based condition configured for SDDC group 110 is satisfied. For example, SERVICE1 may be enabled for SDDC group traffic during business hours, and SERVICE2 enabled during non-business hours. Additionally or alternatively, block 610 may involve detecting one of the following events associated with SDDC group 110: (a) removal of SDDC group 110; (b) removal of SDDC1 111 or SDDC2 112 from SDDC group 110; and (c) addition of a third SDDC (e.g., new member=SDDC3 in FIG. 9) to SDDC group 110. See 611-613 in FIG. 6.

At 620 (yes) and 630 in FIG. 6, in response to determination to enable SERVICE1 based on the event, cloud orchestrator 301 may perform a first configuration to enable SERVICE1 and disable SERVICE2. For example in FIG. 7, in response to detecting first event 710, cloud orchestrator 301 may generate and send a first instruction (INSTR1) to instruct SDDC1 111 to update first routing information and forward a first flow towards SDDC2 112 using SERVICE1 provided by VTGW 105. Further, in response to detecting first event 710, cloud orchestrator 301 may generate and send a second instruction (INSTR2) to instruct SDDC2 112 to update second routing information and forward a second flow towards SDDC1 111 using SERVICE1 provided by VTGW 105. See also 631-632 in FIGS. 6 and 720-725 in FIG. 7.

Otherwise, at 620 (no) and 640 in FIG. 6, in response to determination to enable SERVICE1 based on the event, cloud orchestrator 301 may perform a second configuration to enable SERVICE2 and disable SERVICE1. For example in FIG. 7, in response to detecting second event 750, cloud orchestrator 301 may generate and send a third instruction (INSTR3) to instruct SDDC1 111 to update the first routing information and forward the first flow towards SDDC2 112 using SERVICE2 provided by VPN connection 360. Further, in response to detecting second event 750, cloud orchestrator 301 may generate and send a fourth instruction (INSTR4) to instruct SDDC2 112 to update the second routing information and forward the second flow towards SDDC1 111 using SERVICE2 provided by VPN connection 360. See also 641-642 in FIGS. 6 and 760-765 in FIG. 7.

Any suitable approach may be implemented to update first/second routing information such that the first/second flow is forwarded using an enabled service instead of a disabled service. For example in FIG. 7, each EDGE 121/122 in SDDC 111/112 may be programmed with M=2 routing entries that associate the same destination network with respective SERVICE1 and SERVICE2; see 730-735, 740-745, 770-775 and 780-785. In one example, a particular routing entry may be assigned with a higher priority level to ensure that traffic is forwarded based on that routing entry. In another example, a particular routing entry that is associated with a disabled service may be removed from a routing table, and reinstated when the service is enabled at a later time. More details will be explained below using FIGS. 8-9.

Detailed Examples of Dynamic Connectivity Service Configuration

The example in FIGS. 6-7 will be explained further using FIG. 8, which 8 is a flowchart of example detailed process 800 for computer system 301 to dynamic connectivity service configuration for SDDC group 110. Example process 800 may include one or more operations, functions, or actions illustrated by one or more blocks, such as 810 to 880. Depending on the desired implementation, various blocks may be combined into fewer blocks, divided into additional blocks, and/or eliminated.

(a) Route Collection

At 810-815 and 820-825 in FIG. 4, cloud orchestrator 301 may perform route collection to obtain first routing information that is applicable by EDGE1 121 in SDDC1 111 and second routing information that is applicable by EDGE2 122 in SDDC2 112. The first/second routing information may be collected during business or non-business hours, etc. The first/second routing information may be collected based on route(s) advertised over multiple connectivity services (e.g., VTGW 105 and VPN 360). Assuming only SERVICE1 provided by VTGW 105 is provisioned at this stage, the first routing information may associate (a) destination network=20.20.20.0/24 located in SDDC2 112 with (b) next hop=VTGW 105. Similarly, the second routing information may associate (a) destination network=10.10.10.0/24 located in SDDC1 111 with (b) next hop=VTGW 105.

Similar to the example in FIG. 4, the routing information (e.g., tier-0 route tables) may be obtained by invoking API(s) supported by management entity 171/172 (see FIG. 1) in SDDC 111/112. The routing information may be obtained (e.g., retrieved or received) using a GET operation using parameters such as EDGE identifier (ID), etc. For example, a first GET operation specifying ID="EDGE1" associated with EDGE1 121 may be invoked to obtain the first routing information from first management entity 171. A second GET operation specifying ID="EDGE2" associated with EDGE2 122 may be invoked to obtain the second routing information from second management entity 171. Other parameter(s) may specify a list of fields to be included in the query result, how routing entries are sorted in the query result, etc. In practice, routing information 730/740 may specify a next hop associated with SERVICE1=VTGW 105.

Depending on the desired implementation, route collection may further involve cloud orchestrator 301 obtaining routing information advertised over VTGW 105 connectivity uplink by invoking any suitable API(s), such as to initiate a GET operation (e.g., GET/transit-gateway-route-tables/, /transit-gateway-routes/ or /transit-gateway-routes/<id>) identifying a unique ID associated with VTGW 105. The query result may include routing information (i.e., transit gateway routes) applicable by VTGW 105 to facilitate SDDC group traffic forwarding between a pair of SDDCs, between SDDC(s) and on-premises data center 103 and between SDDC(s) and VPC(s).

(b) Route Entry Programming

At 830-835 in FIG. 4, cloud orchestrator 301 may instruct EDGE1 121 via management entity 171 (see FIG. 1) to program or configure first routing information (see 730-735 in FIG. 7) that includes multiple routing entries associated with respective SERVICE1 and SERVICE2. Using the example in FIG. 7, the first routing information may include first routing entry 730 specifying (a) destination network=20.20.20.0/24, (b) next hop associated with SERVICE1 provided by VTGW 105 and (c) priority level=P1. The first routing information may further include second routing entry 735 specifying (a) the same destination network=20.20.20.0/24, (b) next hop associated with SERVICE2 provided by VPN connection 360 and (c) priority level=P2.

At 840-845 in FIG. 4, cloud orchestrator 301 may instruct EDGE2 122 via management entity 172 (see FIG. 1) to program or configure second routing information (see 740-745 in FIG. 7) that includes multiple sets of routing entries associated with respective SERVICE1 and SERVICE2. Using the example in FIG. 7, the second routing information may include first routing entry 740 specifying (a) destination network=20.20.20.0/24, (b) next hop associated with SERVICE1 provided by VTGW 105 and (c) priority level=P3. The second routing information may further include second routing entry 745 specifying (a) the same destination network=20.20.20.0/24, (b) next hop associated with SERVICE2 provided by VPN connection 360 and (c) priority level=P4.

(c) Event Detection

Figure 8:
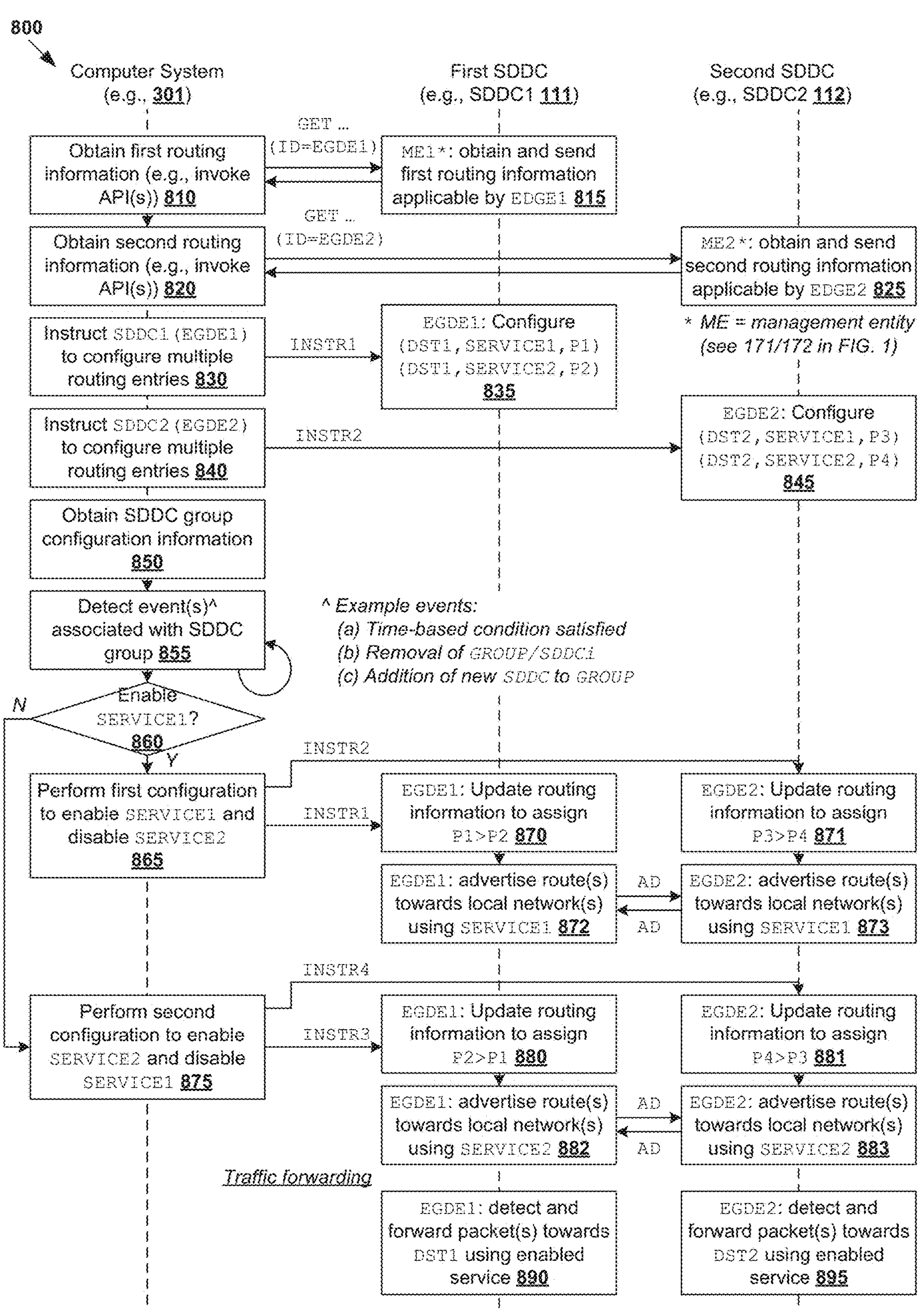
FIG. 8 is a flowchart of an example detailed process for a computer system to dynamic connectivity service configuration for an SDDC group.

At 850 in FIG. 8, cloud orchestrator 301 may obtain configuration information associated with SDDC group 110, such as by invoking application programming interface(s) (API(s)) supported by a cloud provider (e.g., AWS). The configuration information may be obtained when SDDC group 110 is recreated and include a list of members of SDDC group 110.

At 855 in FIG. 8, cloud orchestrator 301 may detect an event associated with SDDC group 110. In one example, based on the SDDC group configuration information, cloud orchestrator 301 may detect one of the following events that may affect connectivity via VTGW 105 (i.e., SERVICE1): (a) removal of SDDC group 110, (b) removal of SDDC(s) from SDDC group 110 and (c) addition of new SDDC to SDDC group 110. In another example, cloud orchestrator 301 may detect the event in response to determination that a time-based condition configured for SDDC group 110 is satisfied, such as the start of business hours (e.g., 8 AM to 6 PM) or the start of non-business hours.

(d) Enabling SERVICE1 and Disabling SERVICE2

At 860 (yes) and 865 in FIG. 8, in response to determination to enable SERVICE1 based on the event, cloud orchestrator 301 may perform a first configuration to enable SERVICE1 and disable SERVICE2. Using the example in FIG. 7, in response to detecting first event 710, cloud orchestrator 301 may enable SERVICE1 in SDDC1 111 by generating and sending a first instruction (INSTR1) to EDGE1 121 via first management entity 171. The first instruction is to cause EDGE1 121 to assign a higher priority (i.e., P1>P2) for first routing entry 730 specifying (20.20.20.0/24, SERVICE1, P1) compared to second routing entry 735 specifying (20.20.20.0/24, SERVICE2, P2). This is to ensure that the first flow towards destination network=20.20.20.0/24 is routed over VTGW 105 instead of VPN connection 360. See also 870 in FIG. 8.

Further, in response to detecting first event 710, cloud orchestrator 301 may enable SERVICE1 in SDDC2 112 by generating and sending a second instruction (INSTR2) to EDGE2 122 via second management entity 172. The second instruction is to cause EDGE2 122 to assign a higher priority (i.e., P3>P4) for second routing entry 740 specifying (10.10.10.0/24, SERVICE1, P3) compared to second routing entry 745 specifying (10.10.10.0/24, SERVICE2, P4). Again, this is to ensure that the second flow towards destination network=10.10.10.0/24 is routed over VTGW 105 instead of VPN connection 360. See also 871 in FIG. 8.

At 872 in FIG. 8, EDGE1 121 may generate and send first route advertisement(s) specifying first local network=10.10.10.0/24 towards EDGE2 122 using SERVICE1 provided by VTGW 105. This is to advertise to EDGE2 122 and intermediate network element(s) that the first local network segment is reachable using SERVICE1. At 873, EDGE2 122 may generate and send second route advertisement(s) specifying second local network=20.20.20.0/24 towards EDGE1 121 using SERVICE1 provided by VTGW 105. This is to advertise to EDGE1 121 and intermediate network element(s) that the second local network segment is reachable using SERVICE1.

At 890 in FIG. 8, in response to detecting packet(s) destined for 20.20.20.0/24, EDGE1 121 may apply higher-priority routing entry 730 specifying (20.20.20.0/24, SERVICE1, P1) to forward the packet(s) towards EDGE2 122 via VTGW 105. Similarly, at 895, in response to detecting packet(s) destined for 10.10.10.0/24, EDGE2 122 may apply higher-priority routing entry 740 specifying (10.10.10.0/24, SERVICE1, P3) to forward the packet(s) towards EDGE1 121 via VTGW 105. See 730, 740 in FIG. 7.

(e) Disabling SERVICE1 and Enabling SERVICE2

At 860 (no) and 875 in FIG. 8, in response to determination to enable SERVICE1 based on the event, cloud orchestrator 301 may perform a second configuration to enable SERVICE2 and disable SERVICE1. Using the example in FIG. 7, in response to detecting second event 750, cloud orchestrator 301 may generate and send a third instruction (INSTR3) to EDGE1 121 via first management entity 171. The first instruction is to cause EDGE1 121 to assign a higher priority (i.e., P2>P1) for second routing entry 770 specifying (20.20.20.0/24, SERVICE2, P2) compared to first routing entry 775 specifying (20.20.20.0/24, SERVICE1, P1). This is to ensure that the first flow towards destination network=20.20.20.0/24 is routed over VPN connection 360 instead of VTGW 105. See also 880 in FIG. 8.

Further, in response to detecting second event 750, cloud orchestrator 301 may generate and send a fourth instruction (INSTR4) to EDGE2 122 via second management entity 172. The second instruction is to cause EDGE2 122 to assign a higher priority level (i.e., P4>P3) to second routing entry 780 specifying (10.10.10.0/24, SERVICE2, P3) compared to first routing entry 785 specifying (10.10.10.0/24, SERVICE1, P4). Again, this is to ensure that the second flow towards destination network=10.10.10.0/24 is routed over VPN connection 360 instead of VTGW 105. See also 881 in FIG. 8.

At 882 in FIG. 8, EDGE1 121 may generate and send first route advertisement(s) specifying first local network=10.10.10.0/24 towards EDGE2 122 via VPN connection 360. This is to advertise to SDDC2 112 and intermediate network element(s) that the local network segment is reachable using SERVICE2. At 883, EDGE2 122 may generate and send second route advertisement(s) specifying local network=20.20.20.0/24 towards EDGE1 121 via VPN connection 360. This is to advertise to SDDC1 111 and intermediate network element(s) that the local network segment is reachable using SERVICE2.

At 890 in FIG. 8, in response to detecting packet(s) destined for 20.20.20.0/24, EDGE1 121 may apply higher-priority routing entry 770 specifying (20.20.20.0/24, SERVICE2, P2) to forward the packet(s) towards EDGE2 122 via VPN connection 260. Similarly, at 895, in response to detecting packet(s) destined for 10.10.10.0/24, EDGE2 122 may apply higher-priority routing entry 780 specifying (10.10.10.0/24, SERVICE2, P4) to forward the packet(s) towards EDGE1 121 via VPN connection 260. See 770, 780 in FIG. 7.

Example Events

Figure 9:
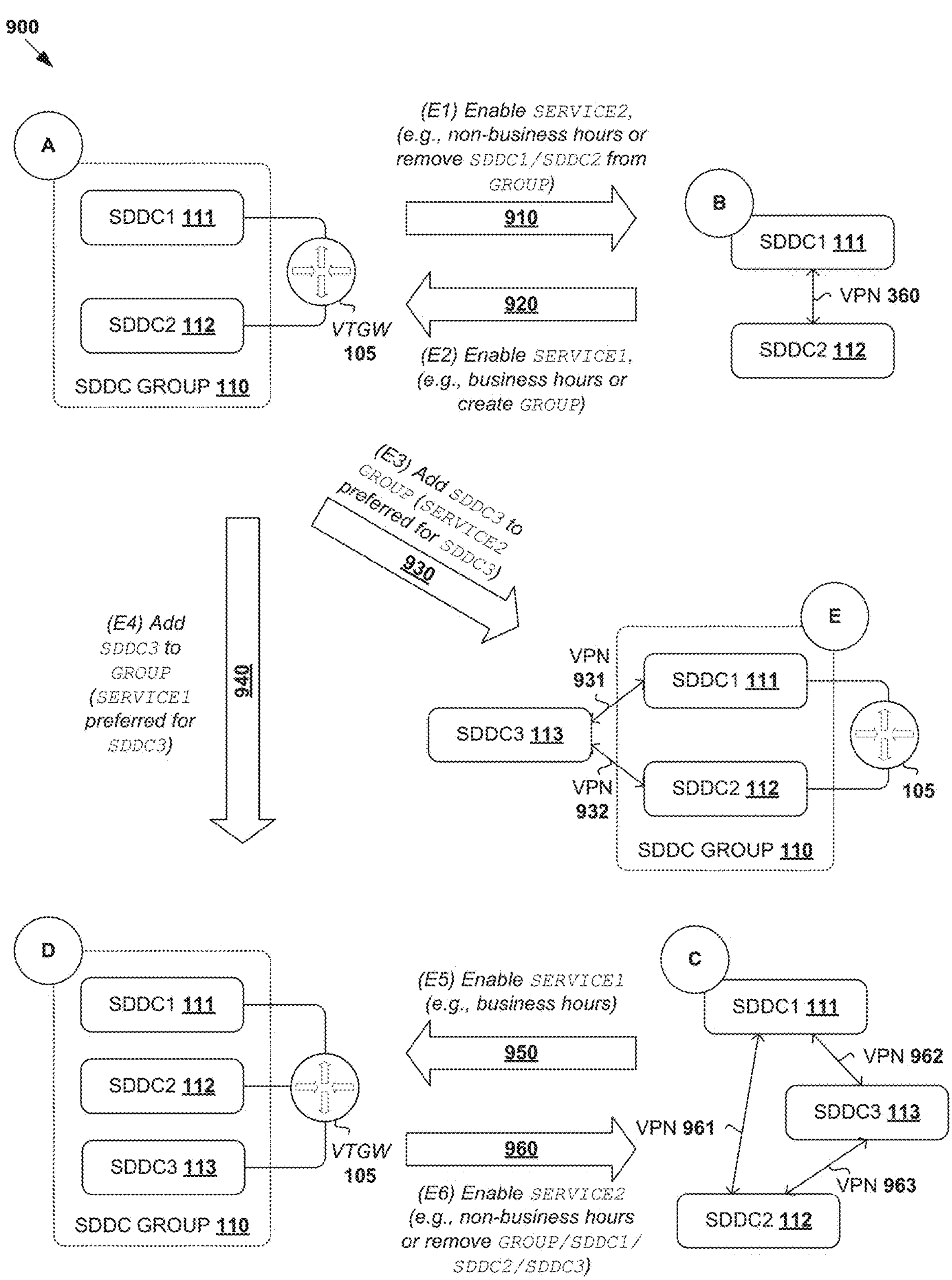
FIG. 9 is a schematic diagram illustrating example events for dynamic connectivity service configuration for an SDDC group.

FIG. 9 is a schematic diagram illustrating example events 900 for dynamic connectivity service configuration for SDDC group 110. In this example, four connectivity service configurations (labelled "A" to "E") are shown. Various implementation details discussed with reference to FIGS. 1, 6-8 are applicable here and will not be repeated for brevity.

At 910 in FIG. 9, based on a first event (E1), cloud orchestrator 301 may disable SERVICE1 and enable SERVICE2. In particular, cloud orchestrator 301 may cause a transition from configuration "A" that relies on VTGW 105 to configuration "B" that relies on VPN connection 360. For example, the first event (E1) may indicate that a time-based condition (e.g., non-business hours) configured for SDDC group 110 is satisfied. In another example, the first event (E1) may be associated with SDDC group configuration, such as to remove/delete SDDC group 110 or remove SDDC 111/112 from SDDC group 110. In response, cloud orchestrator 301 may instruct SDDC1 111 and SDDC2 112 to enable SERVICE2 by assigning a higher priority level to routing entries associated with SERVICE2, performing route advertisement(s) using SERVICE2 and forward traffic via VPN connection 360.

At 920 in FIG. 9, based on a second event (E2), cloud orchestrator 301 may enable SERVICE1 and disable SER- VICE2. In particular, cloud orchestrator 301 may cause a transition from configuration "B" to "A." For example, the second event (E2) may indicate that a time-based condition (e.g., business hours) configured for SDDC group 110 is satisfied. In another example, the second event (E2) may be associated with SDDC group configuration, such as to re-create SDDC group 110 or add SDDC 111/112 to SDDC group 110. In response, cloud orchestrator 301 may instruct SDDCs 111-112 to enable SERVICE1 by assigning a higher priority level to routing entries associated with SERVICE1, performing route advertisement(s) using SERVICE1 and forward traffic via VTGW 105.

At 930 in FIG. 9, cloud orchestrator 301 may detect a third event (E3) to add third SDDC=SDDC3 113 to SDDC group 110 where SERVICE2=preferred connectivity service for SDDC3 113. In response, cloud orchestrator 301 may cause a transition from configuration "A" that uses SERVICE1 to configuration "E" that uses both SERVICE1 and SERVICE2. In this case, cloud orchestrator 301 may instruct SDDC3 113 to establish VPN connections 931-932 with respective SDDCs 111-112 and forward subsequent traffic using those connections. SDDC1 111 and SDDC2 112 may be connected via VGTW 105.

At 940 in FIG. 9, cloud orchestrator 301 may detect a fourth event (E4) to add third SDDC=SDDC3 113 to SDDC group 110 where SERVICE1=preferred connectivity service for SDDC3 113. In response, cloud orchestrator 301 may cause a transition from configuration "A" to "D." While SDDC group 110 and VGTW 105 are being reconfigured, there may be a first transition from configuration "A" to "C." In response to determination that VTGW 105 is up and running, there may be a second transition from "C" to "D."

At 950 in FIG. 9, based on a fifth event (E5), cloud orchestrator 301 may enable SERVICE1 and disable SERVICE2. In particular, cloud orchestrator 301 may cause a transition from configuration "C" to "D." For example, the fifth event (E5) may indicate that a time-based condition (e.g., business hours) configured for SDDC group 110 is satisfied. In another example, the fifth event (E5) may be associated with SDDC group configuration, such as to re-create SDDC group 110 or add SDDC 111/112/113 to SDDC group 110. Once VTGW 105 is up and running, cloud orchestrator 301 may instruct SDDC1 111 and SDDC2 112 to enable SERVICE1 by assigning a higher priority level to routing entries associated with SERVICE1 and performing route advertisement(s) using SERVICE1. Subsequent traffic is forwarded via VTGW 105.

At 950 in FIG. 9, based on a sixth event (E6), cloud orchestrator 301 may disable SERVICE1 and enable SERVICE2. In particular, cloud orchestrator 301 may cause a transition from configuration "D" to configuration "C." For example, the sixth event (E6) may indicate that a time-based condition (e.g., non-business hours) configured for SDDC group 110 with three members 111-113 is satisfied. In another example, the sixth event (E6) may be associated with SDDC group configuration, such as to remove/delete SDDC group 110 or SDDC 111/112 from SDDC group 110. Cloud orchestrator 301 may instruct SDDCs 111-112 to (a) enable SERVICE2 by assigning a higher priority level to routing entries associated with SERVICE2, (b) perform route advertisement(s) using SERVICE2 and (c) forward traffic via VPN connections 961-963. In practice, the number of VPN connections provisioned for SDDC group 110 may depend on the number of members in that SDDC group 110. Each VPN connection may be one to one, or one to many.

Physical Implementation View

Figure 10:
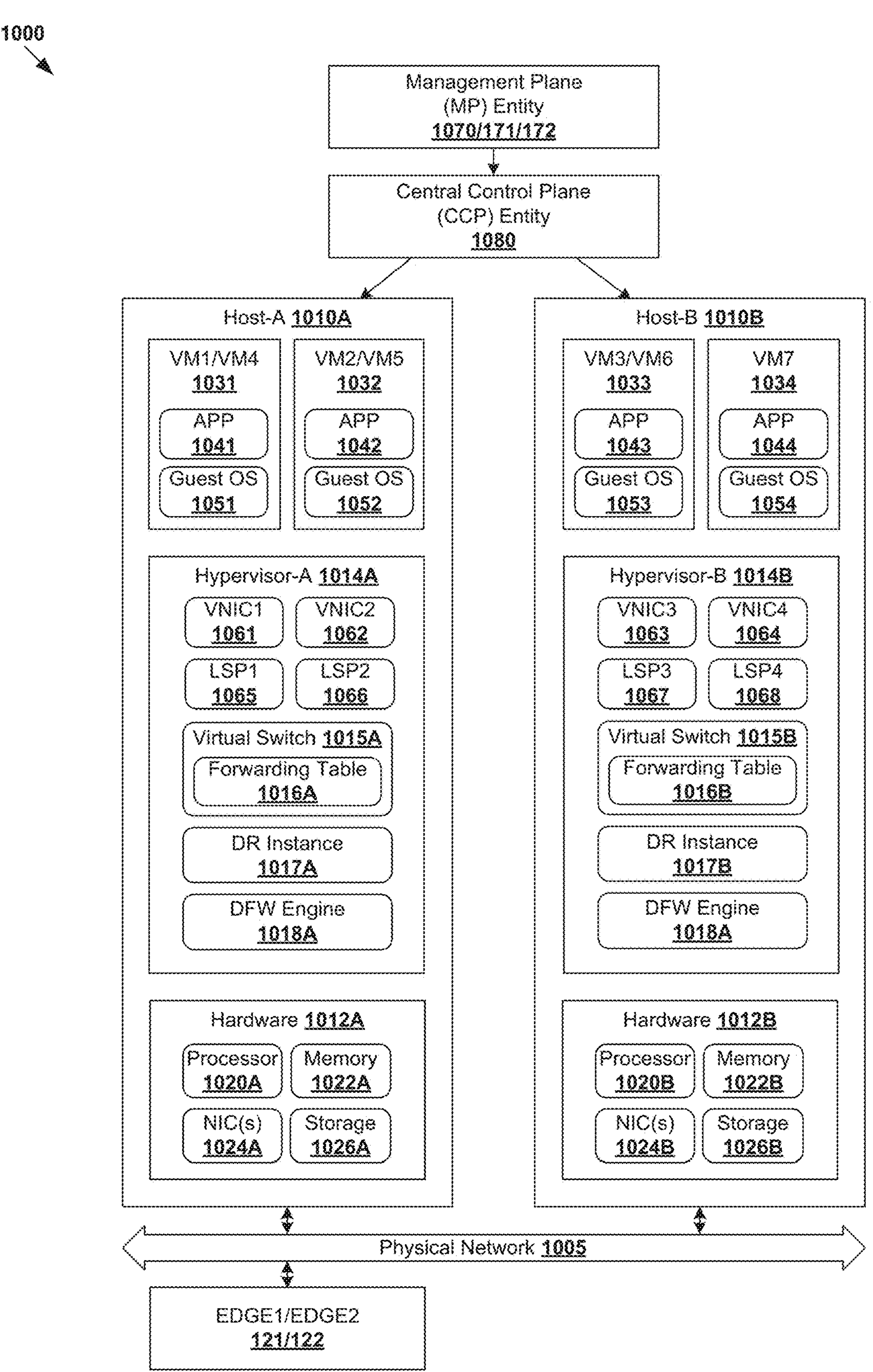
FIG. 10 is a schematic diagram illustrating a physical implementation view of an example SDDC in an SDN environment.

FIG. 10 is a schematic diagram illustrating a physical implementation view 1000 of an example SDDC deployed in SDN environment 1000. It should be understood that, depending on the desired implementation, FIG. 10 may include additional and/or alternative components. In practice, SDN environment 100 may include any number of hosts (also known as "computer systems," "computing devices", "host computers", "host devices", "physical servers", "server systems", "transport nodes," etc.).

In the example in FIG. 10, a deployed SDDC in SDN environment 1000 may include host-A 1010A and host-B 1010B. Host 1010A/1010B may include suitable hardware 1012A/1012B and virtualization software (e.g., hypervisor-A 1014A, hypervisor-B 1014B) to support various VMs. For example, host-A 1010A may support VMs 1031-1033 (representing either VM1-VM3 or VM4-VM6 in FIG. 3) and VM7 1034 are supported by host-B 1010B. Hardware 1012A/1012B includes suitable physical components, such as central processing unit(s) (CPU(s)) or processor(s) 1020A/1020B; memory 1022A/1022B; physical network interface controllers (PNICs) 1024A/1024B; and storage disk(s) 1026A/1026B, etc.

Hypervisor 1014A/1014B maintains a mapping between underlying hardware 1012A/1012B and virtual resources allocated to respective VMs. Virtual resources are allocated to respective VMs 1031-1034 to support a guest operating system (OS; not shown for simplicity) and application(s); see 1041-1044, 1051-1054. For example, the virtual resources may include virtual CPU, guest physical memory, virtual disk, virtual network interface controller (VNIC), etc. Hardware resources may be emulated using virtual machine monitors (VMMs). For example in FIG. 10, VNICs 1061-1064 are virtual network adapters for VMs 1031-1034, respectively, and are emulated by corresponding VMMs (not shown) instantiated by their respective hypervisor at respective host-A 1010A and host-B 1010B. The VMMs may be considered as part of respective VMs, or alternatively, separated from the VMs. Although one-to-one relationships are shown, one VM may be associated with multiple VNICs (each VNIC having its own network address).

Although examples of the present disclosure refer to VMs, it should be understood that a "virtual machine" running on a host is merely one example of a "virtualized computing instance" or "workload." A virtualized computing instance may represent an addressable data compute node (DCN) or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system.

The term "hypervisor" may refer generally to a software layer or component that supports the execution of multiple virtualized computing instances, including system-level software in guest VMs that supports namespace containers such as Docker, etc. Hypervisors 1014A-B may each implement any suitable virtualization technology, such as VMware ESX® or ESXi™ (available from VMware, Inc.), Kernel-based Virtual Machine (KVM), etc. The term "packet" may refer generally to a group of bits that can be transported together, and may be in another form, such as "frame," "message," "segment," etc. The term "traffic" or "flow" may refer generally to multiple packets. The term "layer-2" may refer generally to a link layer or media access control (MAC) layer; "layer-3" a network or IP layer; and "layer-4" a transport layer (e.g., using Transmission Control Protocol (TCP), User Datagram Protocol (UDP), etc.), in the Open System Interconnection (OSI) model, although the concepts described herein may be used with other networking models.

SDN controller 1080 and SDN manager 1070 are example network management entities. One example of an SDN controller is the NSX controller component of VMware NSX® (available from VMware, Inc.) that operates on a central control plane. SDN controller 1070 may be a member of a controller cluster (not shown for simplicity) that is configurable using SDN manager 1080. Network management entity 1070/1080 may be implemented using physical machine(s), VM(s), or both. To send or receive control information, a local control plane (LCP) agent (not shown) on host 1010A/1010B may interact with SDN controller 1070 via a control-plane channel.

Through virtualization of networking services in SDN environment 100, logical networks (also referred to as overlay networks or logical overlay networks) may be provisioned, changed, stored, deleted, and restored programmatically without having to reconfigure the underlying physical hardware architecture. Hypervisor 1014A/1014B implements virtual switch 1015A/1015B and logical distributed router (DR) instance 1017A/1017B to handle egress packets from, and ingress packets to, VMs 1031-1034. In SDN environment 100, logical switches and logical DRs may be implemented in a distributed manner and can span multiple hosts.

For example, a logical switch (LS) may be deployed to provide logical layer-2 connectivity (i.e., an overlay network) to VMs 1031-1034. A logical switch may be implemented collectively by virtual switches 1015A-B and represented internally using forwarding tables 1016A-B at respective virtual switches 1015A-B. Forwarding tables 1016A-B may each include entries that collectively implement the respective logical switches. Further, logical DRs that provide logical layer-3 connectivity may be implemented collectively by DR instances 1017A-B and represented internally using routing tables (not shown) at respective DR instances 1017A-B. Each routing table may include entries that collectively implement the respective logical DRs.

Packets may be received from, or sent to, each VM via an associated logical port. For example, logical switch ports 1065-1068 (labelled "LSP1" to "LSP4") are associated with respective VMs 1031-1034. Here, the term "logical port" or "logical switch port" may refer generally to a port on a logical switch to which a virtualized computing instance is connected. A "logical switch" may refer generally to a software-defined networking (SDN) construct that is collectively implemented by virtual switches 1015A-B, whereas a "virtual switch" may refer generally to a software switch or software implementation of a physical switch. In practice, there is usually a one-to-one mapping between a logical port on a logical switch and a virtual port on virtual switch 1015A/1015B. However, the mapping may change in some scenarios, such as when the logical port is mapped to a different virtual port on a different virtual switch after migration of the corresponding virtualized computing instance (e.g., when the source host and destination host do not have a distributed virtual switch spanning them).

A logical overlay network may be formed using any suitable tunneling protocol, such as Virtual extensible Local Area Network (VXLAN), Stateless Transport Tunneling (STT), Generic Network Virtualization Encapsulation (GENEVE), Generic Routing Encapsulation (GRE), etc. For example, VXLAN is a layer-2 overlay scheme on a layer-3 network that uses tunnel encapsulation to extend layer-2 segments across multiple hosts. Hypervisor 1014A/1014B may implement virtual tunnel endpoint (VTEP) 1019A/1019B to encapsulate and decapsulate packets with an outer header (also known as a tunnel header) identifying the relevant logical overlay network (e.g., VNI). Hosts 1010A-B may maintain data-plane connectivity with each other via physical network 1005 to facilitate east-west communication among VMs 1031-1034. Hosts 1010A-B may also maintain data-plane connectivity with EDGE 121/122 in FIGS. 1, 3 and 7 via physical network 1005.

Although discussed using VMs 1031-1034, it should be understood that adaptive traffic forwarding may be performed for other virtualized computing instances, such as containers, etc. The term "container" (also known as "container instance") is used generally to describe an application that is encapsulated with all its dependencies (e.g., binaries, libraries, etc.). For example, multiple containers may be executed as isolated processes inside VM 1031, where a different VNIC is configured for each container. Each container is "OS-less", meaning that it does not include any OS that could weigh 10*s* of Gigabytes (GB). This makes containers more lightweight, portable, efficient, and suitable for delivery into an isolated OS environment. Running containers inside a VM (known as "containers-on-virtual-machine" approach) not only leverages the benefits of container technologies but also that of virtualization technologies.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 10.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described or can be alternatively located in one or more devices different from that in the examples. The units in the examples described can be combined into one module or further divided into a plurality of sub-units.

We claim:

1. A computer system to perform connectivity service provisioning for a software-defined data center (SDDC) group in a software-defined networking (SDN) environment that includes the computer system, a first SDDC and a second SDDC, comprising:

a processor; and a non-transitory computer-readable medium having stored thereon instructions that, when executed by the processor, cause the processor to perform the following:

detect an event that affects a first connectivity service connecting multiple members of an SDDC group, wherein the multiple members include the first SDDC and the second SDDC;

obtain, from the first SDDC, first routing information that is applicable in the first SDDC and that associates the first connectivity service with a first flow from the first SDDC to the second SDDC;

obtain, from the second SDDC, second routing information that is applicable in the second SDDC and that associates the first connectivity service with a second flow from the second SDDC to the first SDDC; and in response to the event, generate and send a first instruction towards the first SDDC and a second instruction towards the second SDDC to cause:

(a) the first SDDC and the second SDDC to establish a second connectivity service;

(b) the first SDDC to update the first routing information to associate the first flow with the second connectivity service; and (c) the second SDDC to update the second routing information to associate the second flow with the second connectivity service.

2. The computer system of claim 1, wherein the instructions for detecting the event cause the processor to:

detect one of the following events, being a first event, associated with the SDDC group: (a) removal of the SDDC group from the SDN environment; (b) removal of the first SDDC or the second SDDC from the SDDC group; and (c) addition of a third SDDC, being a new member, to the SDDC group.

3. The computer system of claim 1, wherein the instructions for detecting the event cause the processor to:

detect the event that affects the first connectivity service provided by a virtual transit gateway that is configured to connect the multiple members of the SDDC group, to connect at least one of the multiple members with an on-premises data center and to connect at least one of the multiple members with a virtual network.

4. The computer system of claim 1, wherein the instructions for obtaining the first routing information and the second routing information cause the processor to:

obtain, from a first management entity associated with the first SDDC, the first routing information that is applicable by a first edge to forward the first flow towards the second SDDC using the first connectivity service; and obtain, from a second management entity associated with the second SDDC, the second routing information that is applicable by a second edge to forward the second flow towards the first SDDC using the first connectivity service.

5. The computer system of claim 4, wherein the instructions for obtaining the first routing information or the second routing information cause the processor to:

obtain the first routing information or the second routing information through an application programming interface (API) invocation that specifies a first identifier (ID) associated with the first edge, a second ID associated with the second edge, or a third ID associated with a virtual transit gateway providing the first connectivity service.

6. The computer system of claim 1, wherein the instructions for generating and sending the first instruction and the second instruction cause the processor to:

generate and send the first instruction towards a first management entity to cause a first edge associated with the first SDDC to generate and send a first route advertisement to a second edge associated with the second SDDC, wherein the first route advertisement indicates that a first destination network associated with the second flow is reachable using the second connectivity service; and generate and send the second instruction towards a second management entity to cause the second edge to generate and send a second route advertisement to the first edge, wherein the second route advertisement indicates that a second destination network associated with the first flow is reachable using the second connectivity service.

7. The computer system of claim 2, wherein the instructions further cause the processor to:

in response to detecting a second event to configure the SDDC group to include the first SDDC and the second SDDC, and determining that the first connectivity service is up and running, generate and send instructions to instruct (a) the first SDDC and the second SDDC to disable the second connectivity service, (b) the first SDDC to re-associate the first flow with the first connectivity service and (c) the second SDDC to re-associate the second flow with the first connectivity service.

8. A method for a computer system to perform connectivity service provisioning for a software-defined data center (SDDC) group in a software-defined networking (SDN) environment that includes the computer system, a first SDDC and a second SDDC, wherein the method comprises:

detecting, by the computer system, an event that affects a first connectivity service connecting multiple members of the SDDC group, wherein the multiple members include the first SDDC and the second SDDC;

obtaining, by the computer system, first routing information that is applicable in the first SDDC and that associates the first connectivity service with a first flow from the first SDDC to the second SDDC;

obtaining, by the computer system, second routing information that is applicable in the second SDDC and that associates the first connectivity service with a second flow from the second SDDC to the first SDDC; and in response to the event, generating and sending, by the computer system, a first instruction towards the first SDDC and a second instruction towards the second SDDC to cause:

(a) the first SDDC and the second SDDC to establish a second connectivity service;

(b) the first SDDC to update the first routing information to associate the first flow with the second connectivity service; and (c) the second SDDC to update the second routing information to associate the second flow with the second connectivity service.

9. The method of claim 8, wherein detecting the event comprises:

detecting, by the computer system, one of the following events, being a first event, associated with the SDDC group: (a) removal of the SDDC group from the SDN environment; (b) removal of the first SDDC or the second SDDC from the SDDC group; and (c) addition of a third SDDC, being a new member, to the SDDC group.

10. The method of claim 8, wherein detecting the event comprises:

detecting, by the computer system, the event that affects the first connectivity service provided by a virtual transit gateway that is configured to connect the multiple members of the SDDC group, to connect at least one of the multiple members with an on-premises data center and to connect at least one of the multiple members with a virtual network.

11. The method of claim 8, wherein obtaining the first routing information and the second routing information comprises:

obtaining, by the computer system, from a first management entity associated with the first SDDC, the first routing information that is applicable by a first edge to forward the first flow towards the second SDDC using the first connectivity service; and obtaining, by the computer system, from a second management entity associated with the second SDDC, the second routing information that is applicable by a second edge to forward the second flow towards the first SDDC using the first connectivity service.

12. The method of claim 11, wherein obtaining the first routing information or the second routing information comprises:

obtaining, by the computer system, the first routing information or the second routing information through an application programming interface (API) invocation that specifies a first identifier (ID) associated with the first edge, a second ID associated with the second edge, or a third ID associated with a virtual transit gateway providing the first connectivity service.

13. The method of claim 8, wherein generating and sending the first instruction and the second instruction comprises:

generating and sending, by the computer system, the first instruction towards a first management entity to cause a first edge associated with the first SDDC to generate and send a first route advertisement to a second edge associated with the second SDDC, wherein the first route advertisement indicates that a first destination network associated with the second flow is reachable using the second connectivity service; and generating and sending, by the computer system, the second instruction towards a second management entity to cause the second edge to generate and send a second route advertisement to the first edge, wherein the second route advertisement indicates that a second destination network associated with the first flow is reachable using the second connectivity service.

14. The method of claim 9, wherein the method further comprises:

in response to detecting a second event to configure the SDDC group to include the first SDDC and the second SDDC, and determining that the first connectivity service is up and running, generating and sending, by the computer system, instructions to instruct (a) the first SDDC and the second SDDC to disable the second connectivity service, (b) the first SDDC to re-associate the first flow with the first connectivity service and (c) the second SDDC to re-associate the second flow with the first connectivity service.

15. A non-transitory computer-readable storage medium that includes a set of instructions which, in response to execution by a processor of a computer system, cause the processor to perform a method of connectivity service provisioning for a software-defined data center (SDDC) group in a software-defined networking (SDN) environment that includes the computer system, a first SDDC and a second SDDC, wherein the method comprises:

detecting an event that affects a first connectivity service connecting multiple members of the SDDC group, wherein the multiple members include the first SDDC and the second SDDC;

obtaining, from the first SDDC, first routing information that is applicable in the first SDDC and that associates the first connectivity service with a first flow from the first SDDC to the second SDDC;

obtaining, from the second SDDC, second routing information that is applicable in the second SDDC and that associates the first connectivity service with a second flow from the second SDDC to the first SDDC; and in response to the event, generating and sending a first instruction towards the first SDDC and a second instruction towards the second SDDC to cause:

(a) the first SDDC and the second SDDC to establish a second connectivity service;

(b) the first SDDC to update the first routing information to associate the first flow with the second connectivity service; and (c) the second SDDC to update the second routing information to associate the second flow with the second connectivity service.

16. The non-transitory computer-readable storage medium of claim 15, wherein detecting the event comprises:

detecting one of the following events associated with the SDDC group: (a) removal of the SDDC group from the SDN environment; (b) removal of the first SDDC or the second SDDC from the SDDC group; and (c) addition of a third SDDC, being a new member, to the SDDC group.

17. The non-transitory computer-readable storage medium of claim 15, wherein detecting the event comprises:

detecting the event that affects the first connectivity service provided by a virtual transit gateway that is configured to connect the multiple members of the SDDC group, to connect at least one of the multiple members with an on-premises data center and to connect at least one of the multiple members with a virtual network.

18. The non-transitory computer-readable storage medium of claim 15, wherein obtaining the first routing information and the second routing information comprises:

obtaining, from a first management entity associated with the first SDDC, the first routing information that is applicable by a first edge in the first SDDC to forward the first flow towards the second SDDC using the first connectivity service; and obtaining, from a second management entity associated with the second SDDC, the second routing information that is applicable by a second edge in the second SDDC to forward the second flow towards the first SDDC using the first connectivity service.

19. The non-transitory computer-readable storage medium of claim 16, wherein obtaining the first routing information or the second routing information comprises:

obtaining the first routing information or the second routing information through an application programming interface (API) invocation that specifies a first identifier (ID) associated with the first edge, a second ID associated with the second edge, or a third ID associated with a virtual transit gateway providing the first connectivity service.

20. The non-transitory computer-readable storage medium of claim 15, wherein generating and sending the first instruction and the second instruction comprises:

generating and sending the first instruction towards a first management entity to cause a first edge associated with the first SDDC to generate and send a first route advertisement to a second edge associated with the second SDDC, wherein the first route advertisement indicates that a first destination network associated with the second flow is reachable using the second connectivity service; and generating and sending the second instruction towards a second management entity to cause the second edge to generate and send a second route advertisement to the first edge, wherein the second route advertisement indicates that a second destination network associated with the first flow is reachable using the second connectivity service.

* * * * *